(12) United States Patent
Hoffman et al.

(10) Patent No.: US 9,898,465 B2
(45) Date of Patent: Feb. 20, 2018

(54) SYSTEM AND METHOD FOR PROVIDING AUDIO-VISUAL CONTENT

(71) Applicants: Kristin E. Hoffman, Brooklyn, NY (US); Natasha A. Biljetina, Stoney Creek (CA); E. Sarah R. Dumbrille, Stoney Creek (CA)

(72) Inventors: Kristin E. Hoffman, Brooklyn, NY (US); Natasha A. Biljetina, Stoney Creek (CA); E. Sarah R. Dumbrille, Stoney Creek (CA)

(73) Assignee: SoundSentiments Inc., New York, NY (US)

( * ) Notice: Subject to any disclaimer, the term of this patent is extended or adjusted under 35 U.S.C. 154(b) by 0 days.

(21) Appl. No.: 13/875,018

(22) Filed: May 1, 2013

(65) Prior Publication Data

US 2013/0292462 A1 Nov. 7, 2013

Related U.S. Application Data

(60) Provisional application No. 61/641,261, filed on May 1, 2012.

(51) Int. Cl.
*G06K 19/00* (2006.01)
*G06F 17/30* (2006.01)
*G06K 19/06* (2006.01)

(52) U.S. Cl.
CPC .. *G06F 17/30017* (2013.01); *G06F 17/30058* (2013.01); *G06K 19/06028* (2013.01); *G06K 19/06037* (2013.01)

(58) Field of Classification Search
USPC ........ 235/375, 435, 439, 454, 462, 487, 492
See application file for complete search history.

(56) References Cited

U.S. PATENT DOCUMENTS

| | | | |
|---|---|---|---|
| 5,963,916 A * | 10/1999 | Kaplan | G06F 17/30749 705/26.8 |
| 8,131,597 B2 * | 3/2012 | Hudetz et al. | 705/26.1 |
| 8,777,110 B2 * | 7/2014 | Biskupski et al. | 235/486 |
| 2002/0099764 A1 * | 7/2002 | Stern | G06Q 30/02 709/203 |
| 2006/0235864 A1 * | 10/2006 | Hotelling et al. | 707/101 |
| 2007/0162350 A1 * | 7/2007 | Friedman | 705/26 |
| 2009/0063292 A1 * | 3/2009 | Cole et al. | 705/26 |
| 2009/0168624 A1 * | 7/2009 | Scibora | 369/84 |

(Continued)

*Primary Examiner* — Matthew Mikels
(74) *Attorney, Agent, or Firm* — Marsh IP Law

(57) ABSTRACT

A system and method for providing access to audio-visual (AV) content, such as music or video clips, is described that includes providing an openly accessible code on an item or packaging associated with the item, and a second (limited-access) code associated with the same item or packaging. The first code and the second code can be a quick-response code or other scannable code, or a string of alphanumeric characters. Access to a sample and a full version of the AV content can be provided when the first code or second code, respectively, is scanned, or entered on a particular website or other location, using a device such as a computer, smartphone, or tablet computer. The sample can be a portion or a reduced-quality version of the full AV content. The AV content can be related to images and/or words provided on or associated with the item.

20 Claims, 3 Drawing Sheets

(56) References Cited

U.S. PATENT DOCUMENTS

| | | | |
|---|---|---|---|
| 2009/0247195 A1* | 10/2009 | Palmer | G06Q 30/02 455/466 |
| 2010/0174599 A1* | 7/2010 | Rosenblatt | G06Q 30/02 705/14.37 |
| 2011/0180434 A1* | 7/2011 | Corey | G11B 33/0422 206/308.1 |
| 2012/0030103 A1* | 2/2012 | Hughes et al. | 705/41 |
| 2012/0085828 A1* | 4/2012 | Ziegler | 235/493 |
| 2012/0159563 A1* | 6/2012 | Gomez | H04N 21/4223 725/132 |

* cited by examiner ent disclosure are provided in the specification herein.

SYSTEM AND METHOD FOR PROVIDING AUDIO-VISUAL CONTENT

CROSS-REFERENCE TO RELATED APPLICATION(S)

This application claims priority to U.S. Provisional Application Ser. No. 61/641,261, filed on May 1, 2012, which is incorporated by reference herein in its entirety.

FIELD OF THE DISCLOSURE

The present invention relates to systems and methods for providing goods and associated audio-visual content, such as audio recordings or movie clips or files.

BACKGROUND INFORMATION

There are many products and services available for providing audio-visual (AV) content such as music tracks or albums, other sound recordings, video clips, and the like to consumers. Such products and services can include codes for accessing and/or downloading music files via the internet or other computer-accessible sources. Such codes can be provided in various forms, such as alphanumeric strings or sequences of characters, scannable codes such as bar codes or quick response codes (also known as QR Codes™) and the like. Codes or controlled access to AV content can also be provided in the form of gift cards that may include a predetermined amount of credit that can control the amount of AV content that can be accessed using the gift card. Such gift cards may be provided with a particular monetary value, similar to conventional gift cards or certificates that may be redeemable by various retailers.

Such codes or gift cards are often generic in nature, and allow limited access to or downloading of any AV content (e.g., single-use), or AV content within a particular category (e.g., songs by a particular artist). Some codes may be configured to allow access to a particular song or album, e.g., as a means for music distribution or advertising of a particular song or artist. Often, the AV content made accessible by the code or gift card is unrelated to the form that the code or gift card is provided in (e.g., a plastic card or a code printed on a product such as a label or bottle cap). Further, because access to the AV material may be restricted or unavailable prior to redemption, the purchaser may not be familiar with the particular AV content being purchased or given as a gift.

Accordingly, it is desirable to provide a system and method that provides purchase of, or controlled or limited access to, AV content that relates to and/or accompanies a particular product or item, and further allows such content to be previewed prior to purchase.

SUMMARY OF EXEMPLARY EMBODIMENTS

A system and method for providing access to audio-visual (AV) content, such as a music recording, text, or a video clip, is described. A first code that can be openly accessible or unconcealed can be provided on an item such as a greeting card, a consumer item, a gift item, or the like, or on packaging associated with the item (e.g. a box or envelope, a label or tag affixed to the item, etc.). For example, the first code can be viewable or scannable without disturbing or altering the condition of the item. The first code can provide access to a sample of an audio-visual content, such as a recorded song or book/poetry reading, text, a video clip, or the like. The sample can be a portion of a full version of the AV content, content that is related to the full AV content (e.g., text of lyrics to a song), and/or a reduced-quality version of the AV content (e.g., a version that is recorded at a lower bitrate or video resolution).

The first code can preferably be used a plurality of times (e.g., an unlimited number of times) such that any user can view, listen to, or obtain a copy of a sample of the AV content. The first code can include, e.g., a scannable or computer-readable code such as a bar code or a quick response code, a string or series of alphanumeric characters, etc. In this manner, the first code can provide a potential purchaser or owner of the item with a "try-before-you-buy" sample of the full AV content.

A second code that is concealed such that access to it is limited can also be associated or provided with the same item or packaging. Access to a full version of the AV content can be provided by the second code, which may be a single-use or limited-use code that allows access to the AV content only once or a limited number of times. The second code can be provided inside the packaging or a portion of the object such that it cannot be viewed or scanned unless and until the item packaging is opened, the item is used or otherwise removed from packaging, etc. In further embodiments, a mask can be provided over the second code such that the second code cannot be viewed, scanned, or used until the mask is removed. The mask can include, e.g., an adhesive sticker provided over a printed code that can be peeled off to reveal the code, a scratch-off material that obscures the code until it is removed by abrasion, etc., or the like. The presence of an intact mask can also indicate that the second code has not yet been used. For example, the same first code can be provided with a plurality of the same or similar items, whereas each such item may also be provided with a unique second code to limit access to the full AV content to the possessor of the item.

The first and second codes may be scanned, or entered on a particular website or other location, using a device such as a computer, smartphone, or tablet computer. The sample or full AV content can then be downloaded to the device, or alternatively it can be streamed to the device (e.g., listened to or viewed by the user on the device) when a valid code is entered. For example, scanning a quick response code using a device such as a smartphone or tablet computer can provide instructions to download or stream the AV content (sample or full content, depending on whether a first or second code is scanned) to the device such that the user can then listen to or view the AV content.

In certain embodiments, the AV content can be related to the item or to decorations provided on the item or packaging, such as words or images. For example, the item may have a portion of the lyrics to a song printed on it, and the AV content can include an audio or video recording of the song, or a text document containing the full lyrics. As another example, the item can have words from a poem or story printed on it, and the AV content can be an audio recording of a reading of the poem or story. Accordingly, the item can be purchased for personal use or given as a gift, where the purchase includes both the item itself and the full AV content as accessed by the second code after purchase.

Other embodiments, features, and advantages of the present disclosure are provided in the specification herein.

BRIEF DESCRIPTION OF THE DRAWINGS

Further objects, features and advantages of the disclosure will become apparent from the following detailed description taken in conjunction with the accompanying figures showing illustrative examples, results and/or features of the exemplary embodiments of the present disclosure, in which.

The various embodiments of the disclosure are described herein with reference to the figures, where like reference numbers indicate identical or functionally similar elements. Further features and advantages of the disclosure as well as the structure and operation of various embodiments of the present disclosure are described in detail below with reference to the accompanying drawings. To the extent that the present disclosure does reference the figures, it is done so in connection with the illustrative embodiments and is not limited by the particular embodiments illustrated in the figures. It is intended that changes and modifications can be made to the described embodiments without departing from the true scope and spirit of the present disclosure.

DETAILED DESCRIPTION OF EXEMPLARY EMBODIMENTS

Exemplary embodiments of the disclosure provide a method and system for providing general access to a sample of some audio-visual (AV) content (e.g. part of a song, video recording, other audio recording, etc.) and limited access to the full AV content. Such access can be provided by first and second codes associated with an item such as a greeting card, a packaged gift, a consumer product, etc. The first and second codes can be scanned by an appropriate device and/or entered on a website or otherwise redeemed to provide access to the sample and full AV content, respectively. Access to and/or redemption of the second code can be limited to the possessor of the item, whereas access to or redemption of the first code can be unlimited, e.g., the first code may be viewable or scannable without disturbing the item or packaging associated with it, if present.

Figure 1A:
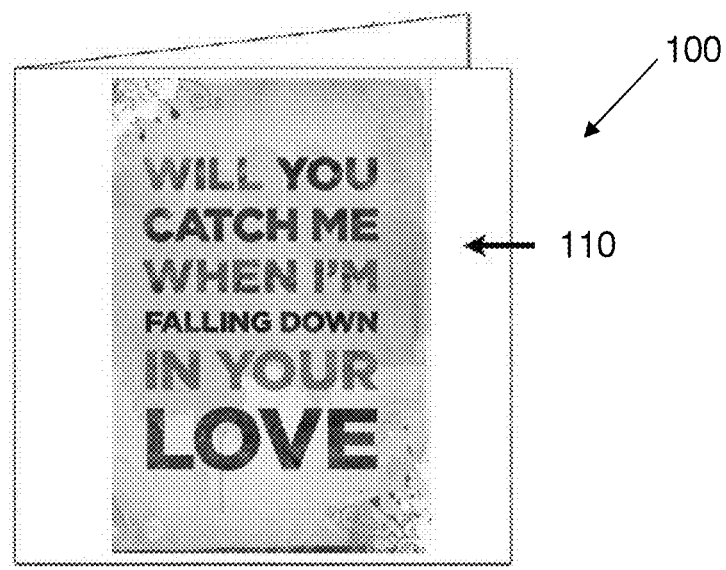
FIG. 1A is a view of the front of an exemplary item (a greeting card) that can be provided with codes to access AV content.
Figure 1B:
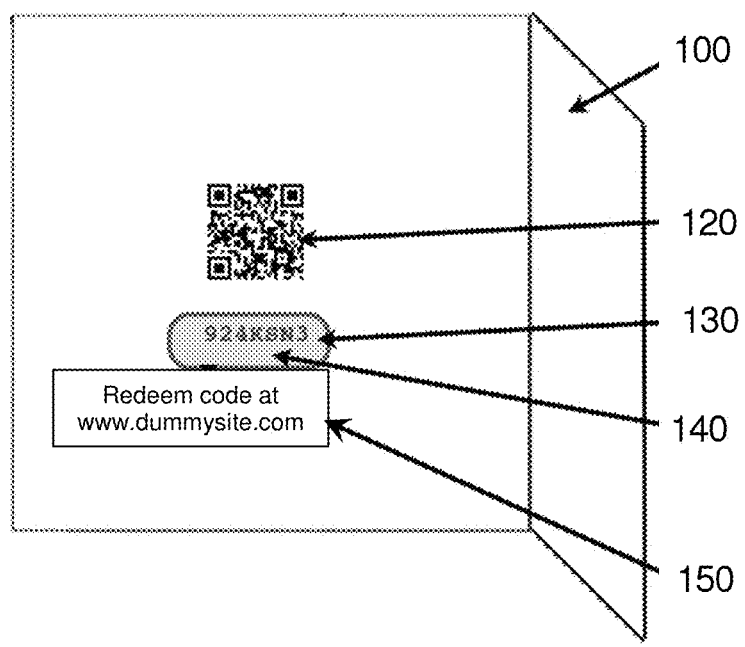
FIG. 1B is an illustration of the inside of the greeting card shown in FIG. 1A that includes both a first code and a second code that facilitate access to a sample of the AV content and the full AV content, respectively.
Figure 1C:
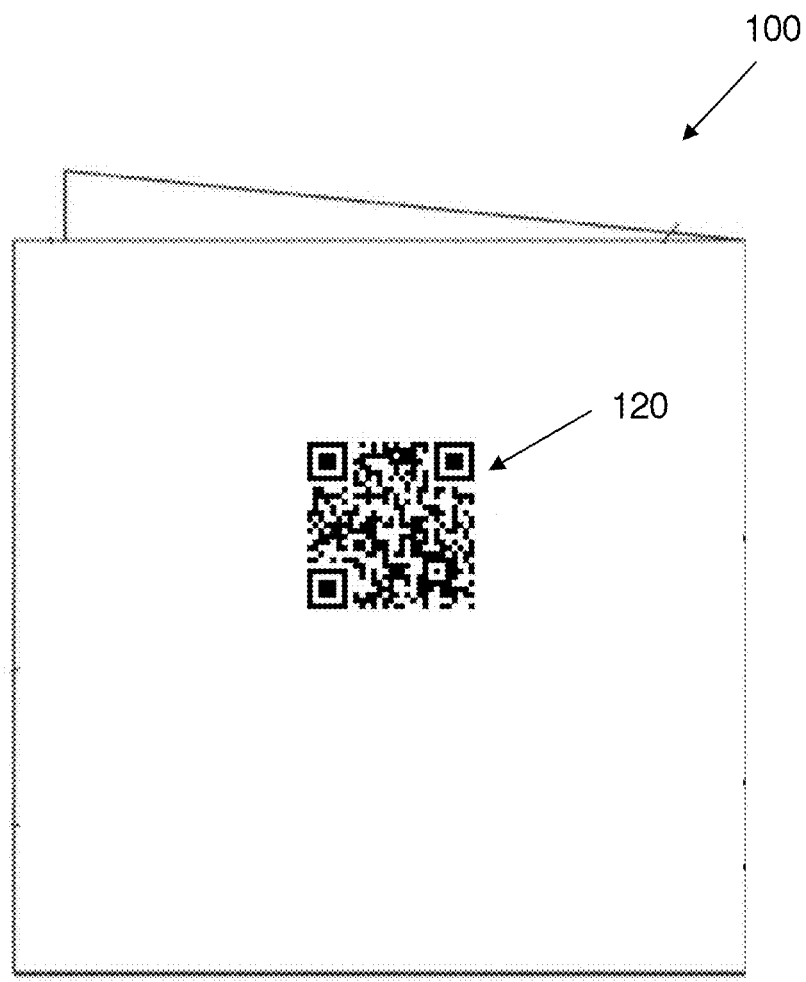
FIG. 1C is an illustration of the back of the greeting card shown in FIG. 1A that includes a further first code that facilitates access to a sample of the AV content.

One exemplary embodiment of the present invention includes a greeting card 100 shown in FIGS. 1A-1C. The front of the greeting card 100 shown in FIG. 1A includes a decoration 110 (e.g., words and/or images) that may be, e.g., a portion of the lyrics to a song, where such lyrics may convey a particular message or sentiment to the purchaser or recipient, or graphic images relating to the song. Such decoration 110 can optionally be provided on other portions of the greeting card 100, such as inside or on the back of the card 100, instead of or in addition to being on the front of the greeting card 100.

The inside of the greeting card 100 is shown in FIG. 1B. The inside of the card can optionally include a first code 120 printed therein. The first code 120 can preferably be accessed without altering the item or packaging containing the item. For example, the first code 120 shown in FIG. 1B can be accessed by opening the card if the card is not contained in a sealed package. In FIG. 1B, this first code 120 is shown as a quick response code, or QR Code™. Quick response codes can be scanned by many devices, such as smartphones, personal computer systems, or computing tablets that are equipped with a camera or other image sensor. Scanning of such codes can include obtaining an image of the code with a suitable device (e.g., a smartphone, a computer scanner, a digital camera or the like) wherein the device can extract information from the image of the code and optionally activate certain processes (e.g. downloading a file or streaming AV content from an accessible source) based on the information. For example, when scanned, such first codes 120 can produce various results, such as opening a web page in an internet browser on the device, downloading a file to the device, etc.

In one embodiment, the first code 120 can be configured to download or stream sample AV content to the device via a network such as the internet or world-wide web (WWW), and either play back the sample AV content automatically or allow the user to play the sample AV file manually on the device. Sample AV content can include, for example, a sample file or data stream containing a portion of an audio or video recording, or text information. The sample AV content that is accessible via the first code 120 can be, e.g., a sound recording that relates to or includes lyrics that may be part of the decoration 110 provided on the greeting card 100. Such sample AV content can include, e.g., a portion of a full AV content (e.g., a refrain or other portion of a full song, a portion of a video clip, etc.), a reduced-quality version of the full AV content, or content associated with such full AV content (e.g., lyrics to a sound recording, a text version of an audio recording of a poetry or story reading, etc.). In still further embodiments, the sample AV content may be a single song from an album or collection of music, and the full AV content can be the full album or collection. In yet further embodiments, the sample AV content may be a recorded reading of a single poem or short story, and the full AV content can be a recording of a collection of poems or stories, respectively.

The greeting card 100 can further include a second, limited-access code 130 provided thereon. In certain embodiments of the disclosure, such second code 130 can be concealed by a mask 140. The mask 140 can be, for example, an adhesive sticker, a scratch-off film, or the like. The mask 140 can prevent access to the second code 130 until the mask 140 is removed, e.g., by peeling or scratching it off. The mask 140 is preferably configured such that it will be evident upon observation if it has been removed or altered, which can indicate that the second code 130 has already been accessed, which may render the second code 130 invalid or unusable. Accordingly, an intact mask 140 can assure a purchaser or user of the card 100 that the second code 130 is valid and unused when it is purchased. Although the second code 130 is visible in FIG. 1B for illustration purposes, it can be obscured by the mask 140 until such mask is removed by the purchaser or recipient of the item 100.

Certain packaging configurations can also be used instead of, or in addition to, the mask 140 to limit or prevent access to the second code 130 until the item is purchased or given to a recipient, the packaging enclosing the item is opened or altered, etc. Such packing configurations can include, e.g., a folded, taped, and/or adhered covering, a sealed wrapper, or the like.

The second code 130 can provide access to a full AV content that is different from the sample AV content accessed using the first code 120. For example, the second code 130 can allow a user to download or stream a datafile containing a full song when scanned by a suitable device, as described herein above. Accordingly, the sample AV content can preferably be a portion of the full AV content, such that accessing the sample AV content using the first code 120 can allow a user or purchaser of the greeting card 100 to preview the song associated with the full AV content available via the second code 130.

The second code 130 can be configured to allow the user to download or stream the full AV content a single time, a pre-set number of times, and/or to just a single or pre-set number of devices. Such access limitations can be provided using conventional systems and algorithms for accessing datafiles and other content via a network or the internet, e.g., through a particular preconfigured website or fileserver.

The second code 130 can be provided in various forms. For example, the exemplary second code 130 shown in FIG. 1B is an alphanumeric code. Such code can be entered into a field provided on a website to allow access to the full AV content associated with the second code 130. In further embodiments, the second code 130 can include a scannable or computer-readable code such as a bar code, a quick response code, or the like. Such scannable second code 130 can be capable of providing access to the full AV content (e.g., by streaming the AV content or downloading one or more data files containing the AV content) when scanned by a suitable device, as described herein above.

Optionally, instructions 150 for using the second code 130 can be printed on or adjacent to the mask 140. Such instructions can include scan instructions to access the full AV content directly (if the second code 130 is scannable), and/or a URL address of a website where the second code 130, in the form of an alphanumeric code or the like, can be entered to access the full AV content. In some embodiments, the second code 130 can be an alphanumeric code, and the first code 120 can be scanned to direct a web browser or the like on the scanning device to a preconfigured website or webpage where the alphanumeric code can then be entered to access the full AV content. Such access procedures, which may include a website address for entering the second code 130, can be included in the instructions 150 if present.

The webpage that a user/purchaser may be directed to, e.g., by the instructions 150, or when scanning the first code 120 and/or second code 130 with an appropriate device, may also be provided with information and/or capability for purchasing additional items, downloading or accessing additional AV content (e.g., a website-based store where further content relating to the sample and/or full AV content can be purchased). For example, the first code 120 and/or second code 130 can direct the user to a website that provides purchase options for more songs, recorded readings, video clips, or other AV content in addition to that accessible by the first code 120 and/or second code 130. Such further content can be, e.g., further songs or albums by the same artist, further readings of works by the same author or poet, etc.

In further embodiments, the first code 120 can be provided on the back of the greeting card 100, as shown in FIG. 1C, instead of or in addition to being provided inside the card as shown in FIG. 1B. This external location of the first code 120 can facilitate access to the sample AV content, for example, even if the greeting card 100 remains closed or is provided in sealed packaging or wrapper (not shown in the figure). For example, the greeting card 100 can be provided in sealed packaging that may be clear or provide an access window to allow scanning of the first code 120 without unsealing the wrapper. In such an embodiment, access to the second code 130 provided on the interior of the card 100 may require opening of the packaging to view or scan the second code 130, and the mask 140 may optionally be omitted because the product packaging itself can limit pre-purchase access to the second code 130.

In further embodiments, the decoration 110 can be provided on the greeting card 100 that relate to the AV content accessible by the first and second codes 120, 130. For example, the full AV content can be a reading of a poem or other literary work, the sample AV content can be a few recorded lines, stanzas, or paragraphs from the work, and the decoration 110 can include certain portions of the poem or literary work, thereby relating the decoration 110 to the sample and full AV content.

In still further embodiments, the decoration 110 can include one or more images provided on the greeting card 100 instead of or in addition to words such as those illustrated in FIG. 1. The sample and/or full AV content can be provided as a video clip or audio recording, or other electronic datafile (which may be downloaded and/or streamed to and displayed on a consumer device such as a computer, smartphone, or tablet device), that may relate to the decoration 110 on the greeting card 100. For example, the full AV content can include one or more images, such as a collection of drawings or paintings, a graphic novel, or the like, that can be accessed by scanning the second code 130 or entering such code on an appropriate website or other access location. The corresponding sample AV content can include a subset of the images, a portion of the graphic novel, etc. In further embodiments, the full AV content can include images (e.g., still images or video files) and/or audio recordings, and the sample AV content can include lower-resolution or reduced-quality versions of the full AV content (e.g., images or video clips provided at a lower visual resolution and/or sound recordings provided at a lesser audio quality). In any of the embodiments described herein, images and/or words relating to the AV content can be provided as part of the decoration 110.

The greeting card 100 that includes one or more first codes 120 can be mass-produced, with the sample AV content associated with the first code 120 optionally relating to the decoration 110 or combination of words and images provided on the greeting card 100. A unique second code 130 can be provided for each card, e.g., by providing such second code 130 on an adhesive sticker that can be applied to a desired location on the greeting card 100. The adhesive sticker containing the second code 130 can also be provided with the mask 140 (e.g., a scratch-off surface or removable sticker that is provided on the adhesive sticker), such that a unique second code 130 can be easily affixed to each greeting card 100. This method for providing greeting cards 100 facilitates mass production of such cards 100 with the first code 120, while allowing control over the inclusion of the limited-use second codes 130. In further embodiments, mass-produced greeting cards 100 can be subjected to a second printing or processing that provides a unique second code 130 on each card, and optionally the mask 140.

In further exemplary embodiments of the present invention, decoration 110 (e.g., words and/or images) relating to AV content can be provided on other goods in addition to greeting cards 100. For example, the decoration 110 can be provided on such items as coffee cups or other drinking vessels, clothing and apparel (e.g., t-shirts), calendars, posters, or other printed products, etc. A plurality of first codes 120 and/or limited-access second codes 130 can be provided on a single item. For example, different decorations 110 can be provided on different displayed pages of a calendar, with corresponding first codes 120 and/or limited-use second codes 130 corresponding to the different decorations 110 also provided. In this manner, for example, a calendar can include a new song, poetry reading, video clip, etc. for each month. Fewer or more codes of either type can also be provided with a single item in further embodiments.

In still further embodiments of the present invention, an item can be provided where the number of first codes 120 is not the same as the number of limited-access codes 130. For example, a calendar can be provided that includes a plurality of second codes 130 that facilitate access to a plurality of full AV content such as a plurality of songs or recorded readings. The back of the calendar can include a single first code 120 that provides access to sample AV relating to one or more of the full AV content corresponding to the plurality of limited-access codes 130. In another exemplary embodiment, an item can be provided with a single first code 120 that provides access to a single song (or portion thereof), and a plurality of second codes 130 can provide access to a plurality of songs for the purchaser or recipient of the item.

In yet further embodiments of the present invention, the decoration 110, first codes 120, and/or second codes 130 can be provided on a tag or label that can be affixed to the item. For example, a shirt or hat can be provided that has decoration 110 and/or images printed thereon. A label affixed to the apparel or other item can include both the first code 120 and a concealed or limited-access second code 130, which can be configured to provide access to sample and full AV content, respectively, that optionally relate to a certain decoration 110 present on the apparel, or to other aspects of the apparel. In a further embodiment, the decoration 110, first codes 120, and second codes 130 can be provided on an item such as a tag for a teabag, or on the packaging for any item. In a still further embodiment, the first code 120 can be printed directly on the item (such as a piece of clothing), e.g., instead of or in addition to being printed on a tag or label associated with the item.

It may be preferable in certain embodiments to limit physical and/or visual access to the second code 130 (and mask 140, if provided) until the gift card 100 or other item that includes such second code 130 is purchased, opened, unwrapped, or ownership thereof transfers to a buyer or recipient, while permitting general access to the first code 120. Such limited access to the second code 130 can be provided for the various embodiments described herein, e.g., through appropriate configuration of packaging and placement of the second code 130 and/or mask 140, use of sealed packaging, or the like.

Figure 2:
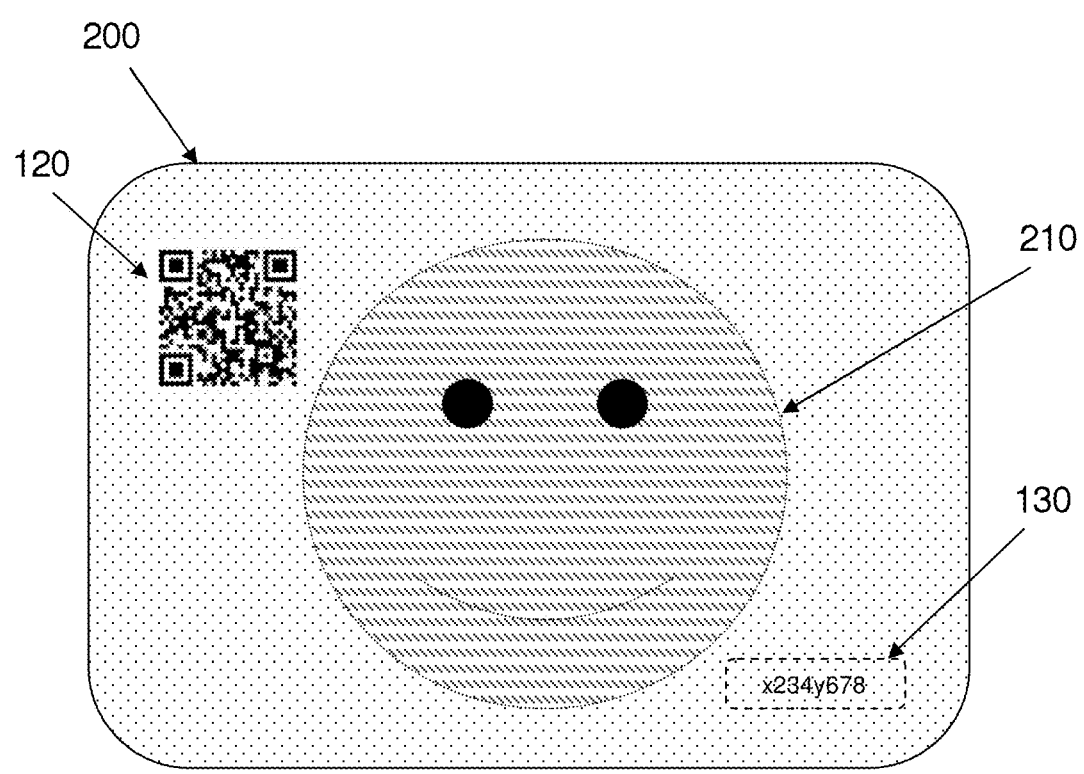
FIG. 2 is a schematic illustration of a packaged item that includes first and second codes to facilitate access to sample and full AV content, respectively, in accordance with further embodiments of the present disclosure.

A further embodiment of the disclosure is illustrated in FIG. 2. A general product package 200 encloses an item 210 that can be, e.g., a consumer item, a gift, etc. The first code 120 is provided on an exterior portion of the package 200. The unlimited-access code 200 can be scanned (or, if provided as an alphanumeric sequence, entered on a webpage or the like) to provide general access to a sample AV content as described herein. The first code 120 can also be provided within the package 200, such that it is visible and/or scannable from the exterior of the package 200 without opening it, e.g., it can be placed beneath a clear window or portion of the package 200. In this manner, the sample AV content can be accessed without opening the package 200.

A second code 130 can be provided inside the package 200, such that it cannot be seen or scanned without opening the package 200. The second code 130 can be affixed to the item 210, printed on an interior surface of the package 200, provided on a card or other object inside the package 200, etc. An optional mask 140 can be provided over the second code 130 to further conceal it and/or to confirm by its presence that the second code 130 has not yet been used or redeemed. The second code 130 can be scanned or entered on a webpage or the like, as described herein, to provide access to the full AV content associated with the sample AV content accessed by the first code 120.

In further embodiments, a plurality of first codes 120 and/or second codes 130 can be provided with a single item 210 and/or product package 200, to provide access to a plurality of sample or full AV content.

The sample and/or full AV content can be provided in a computer-accessible location, such as a website, a webpage, or one or more network locations. For example, datafiles containing the AV content can be stored in a memory arrangement that can be accessed or transferred over a network (e.g., a wired or wireless network) when a code is provided to the location. For example, if the limited-access code or the unlimited-access code is a quick response code, such code can provide data to a device capable of scanning or reading the code that can include the location of the AV content and optionally instructions for the device to download or stream the AV content over the network. An option can also be presented to a user to choose to either download or stream such AV content.

In further embodiments, the computer-accessible location can be identified by a URL or webpage address that can be provided on the item or packaging associated with it, and the limited-access code and/or the unlimited-access code can be a sequence or string of alphanumeric characters or the like. The sample or full AV content can then be accessed by entering the alphanumeric characters into an input field or the like displayed on the webpage or similar accessible location. Optionally, a further option can be provided to a user to either download or stream the sample AV content (if the unlimited-access code is entered) or the full AV content (if the limited-access code is entered).

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

It will thus be appreciated that those skilled in the art will be able to devise numerous systems, arrangements and methods which, although not explicitly shown or described herein, embody the principles of the invention and are thus within the spirit and scope of the present invention. In addition, all publications, patents and patent applications referenced herein are incorporated herein by reference in their entireties.

What is claimed is:

1. A system for providing a particular audio-visual content comprising:
    a tangible product;
    a first substrate and a second substrate, wherein each substrate is provided with the tangible product;
    a first code disposed on the first substrate, and
    a second code disposed on the second substrate,
    wherein the first code is unconcealed and provides unlimited access to a particular portion of the particular audio-visual content; and
    wherein the second code is concealed and provides restricted access to an unlimited amount of the same particular audio-visual content.

2. The system of claim 1, wherein the second code is at least one of a bar code, a quick response code, or an alphanumeric sequence of characters.

3. The system of claim 1, wherein the first code is a scannable code that comprises at least one of a quick response code or a bar code.

4. The system of claim 1, wherein the second code is concealed by a removable mask.

5. The system of claim 4, wherein the removable mask comprises at least one of an adhesive sticker or a scratch-off coating.

6. The system of claim 1, wherein the second code is concealed by providing the second substrate inside a packaging associated with the tangible product to restrict access to the second code.

7. The system of claim 1, wherein the particular audio-visual content is an audio recording.

8. The system of claim 1, wherein the particular audio-visual content is a video recording.

9. The system of claim 1, wherein the particular portion of the particular audio-visual content is at least one of a portion of the particular audio-visual content or a reduced-quality version of at least a portion of the particular audio-visual content.

10. The system of claim 1, wherein the particular audio-visual content is related to at least one of a message or a design provided on at least one of the tangible product, the first substrate, the second substrate, or packaging associated with the tangible product.

11. The system of claim 1, wherein the particular audio-visual content comprises at least one of recorded words or images, and wherein at least a portion of the words or images are provided on at least one of the tangible product, the first substrate, the second substrate, or packaging associated with the tangible product.

12. The system of claim 1, wherein the first code comprises at least one of a bar code or a quick response code.

13. The system of claim 1, wherein the unlimited access to the particular portion of the particular audio-visual content is provided by at least one of streaming or downloading the particular portion of the particular audio-visual content to a consumer device when the first code is scanned by the consumer device, and wherein the consumer device comprises at least one of a smartphone, a computer, or a tablet computer.

14. The system of claim 1, wherein the second code comprises a plurality of alphanumeric characters, and wherein the particular audio-visual content at least one of streams or downloads to a consumer device when the plurality of alphanumeric characters is entered on a webpage.

15. A method for providing a particular audio-visual content comprising:
providing a tangible product;
providing a first substrate and a second substrate with the tangible product;
providing a first code disposed on the first substrate; and
providing a second code disposed on the second substrate;
wherein the first code is unconcealed and provides unlimited access to a particular portion of the particular audio-visual content; and
wherein the second code is concealed and provides restricted access to an unlimited amount of the same particular audio-visual content.

16. The method of claim 15, wherein the tangible product is a greeting card, and wherein each of the first substrate and the second substrate comprises at least one of the greeting card, an envelope provided with the greeting card, or packaging provided with the greeting card.

17. The method of claim 15, wherein the second code is covered by a removable mask.

18. The method of claim 15, wherein the particular portion of the particular audio-visual content is at least one of a portion of the particular audio-visual content or a reduced-quality version of at least a portion of the particular audio-visual content.

19. The system of claim 1, wherein the tangible product comprises the first substrate and the second substrate.

20. The system of claim 1, wherein the tangible product is a greeting card, and wherein each of the first substrate and the second substrate comprises at least one of the greeting card, an envelope provided with the greeting card, or packaging provided with the greeting card.

* * * * *